United States Patent [19]
Heinrich et al.

[11] Patent Number: 5,877,569
[45] Date of Patent: Mar. 2, 1999

[54] DRIVE DEVICE WITH AN ELECTRIC MOTOR AND A RELAY SWITCHING THE MOTOR CURRENT

[75] Inventors: Peter Heinrich, Hintemah; Helmut Sesselmann, Steinach, both of Germany

[73] Assignee: Brose Fahrzeugteile GmbH & Co. KG, Coburg, Germany

[21] Appl. No.: 945,288

[22] PCT Filed: Apr. 19, 1996

[86] PCT No.: PCT/DE96/00721

§ 371 Date: Dec. 11, 1997

§ 102(e) Date: Dec. 11, 1997

[87] PCT Pub. No.: WO96/33547

PCT Pub. Date: Oct. 24, 1996

[30] Foreign Application Priority Data

Apr. 20, 1995 [DE] Germany ............... 195 15 322.7

[51] Int. Cl.⁶ ............... H02K 23/66; H01H 51/22
[52] U.S. Cl. ............... 310/68 R; 310/67 R; 335/228; 335/236; 335/250; 335/278; 335/294
[58] Field of Search ............... 335/228–229, 335/236, 250, 278, 294; 310/68 R, 67 R, 154, 152

[56] References Cited

U.S. PATENT DOCUMENTS

| | | | |
|---|---|---|---|
| 2,386,683 | 10/1945 | Hemphill | 172/239 |
| 4,509,026 | 4/1985 | Matsushita | 335/85 |
| 4,518,937 | 5/1985 | Parker | 335/229 |
| 4,682,133 | 7/1987 | Kern | 335/119 |
| 4,924,126 | 5/1990 | Isozumi | 310/83 |
| 4,978,874 | 12/1990 | Isozumi et al. | 310/83 |
| 5,023,466 | 6/1991 | Isozumi | 290/48 |
| 5,028,900 | 7/1991 | DeWitt | 335/228 |
| 5,227,751 | 7/1993 | Shiroyama et al. | 335/126 |
| 5,546,061 | 8/1996 | Okabayashi et al. | 335/78 |
| 5,677,656 | 10/1997 | Mauch et al. | 335/126 |

FOREIGN PATENT DOCUMENTS

| | | |
|---|---|---|
| 0078324 | 5/1983 | European Pat. Off. . |
| 0474904 | 3/1992 | European Pat. Off. . |
| 3243266 | 11/1982 | Germany . |
| 0546382 | 7/1987 | Germany . |

*Primary Examiner*—Thomas M. Dougherty
*Assistant Examiner*—Tran N. Nguyen
*Attorney, Agent, or Firm*—Christie, Parker & Hale, LLP

[57] ABSTRACT

A drive device with an electric motor with permanent magnets and a pole top more particularly for use with servo drives in motor vehicles. A relay is provided for switching the motor current with at least one electromagnet, which contains a relay coil and a relay armature, and with at least one relay contact. The relay is mounted in the pole top of the electric motor and the magnetic field lines of the electromagnets are closed through the permanent magnets and the pole top of the electric motor.

28 Claims, 13 Drawing Sheets

DRIVE DEVICE WITH AN ELECTRIC MOTOR AND A RELAY SWITCHING THE MOTOR CURRENT

BACKGROUND

European Patent Publication No. 0 474 904 A1 discloses a commutator gear drive unit for the window lift drive of a motor vehicle wherein the motor shaft of the commutator motor is connected to a wormshaft of the gear unit and the commutator of the commutator motor is mounted in brush socket parts for the brush holder which are molded integrally on a flat conductor plate. The flat conductor plate has several structural elements serving to control the commutator motor, including two motor relays which serve to energize the motor winding for the following motor states: "resting", "turning right" and "turning left".

The motor relays take up a considerable amount of space on the conductor plate and thus substantially affect the structural size of the complete control unit. Owing to their close proximity to the electronic components of the conductor plate, electrical breakdowns may result from the switching processes of the motor relays. Accordingly, additional casings or circuitry are required which lead to a further increase in the structural size of the drive unit.

Relays having a tri-stable behaviour for controlling commutator motors for the motor states "resting", "turning right" and "turning left" are known. German Patent No. 32 43 266 C2 discloses a polarized relay which consists of two first yokes which have a U-shaped cross-section which are positioned with their short arms facing each other. The polarized relay also includes second smaller yokes which are enclosed at a distance by the first yokes. A permanent magnet having a magnetic axis running at right angles to the large faces the yokes is mounted between the first and second yokes. The second yokes furthermore enclose an exciter coil which encloses a rod-like armature which is displaceable in the direction of coil axis. The rod-like armature has two ends lying outside of the exciter coil which are formed as plates which are displaceable between the inner faces of the short arms of the first yokes forming pole faces, and the end faces of the second yokes.

The armature consists of two rod halves divided radially in the center of the exciter coil and between which a coil compression spring is mounted whose pretension is measured so that the plates of the armature in the current-less state of the exciter coil adjoin the pole faces of the short arms of of the armature in the current-less state of the exciter coil adjoin the pole faces of the short arms of the first yokes, whereas in the current-charged state of the exciter coil, one or the other plate adjoins the corresponding end faces of the second yokes, depending on the direction of the current flow.

German Patent Publication No. 35 46 382-A1 discloses a polarized electrical mini-relay which is designed as a two-way reverser relay. A leaf armature and reflux elements are mounted at each of the two free ends of a coil core. The leaf armatures are held by permanent magnets arranged in series and during excitation of the coil carry out a synchronized switching process.

SUMMARY

According to one embodiment of the invention, a drive device adapted for use with an electric motor including a permanent magnet and a pole top is provided. The drive device includes a relay for switching a motor current through the electric motor. The relay includes at least one electromagnet which contains a relay coil and a relay armature, and at least one relay contact, more particularly for servo drives in motor vehicles. The relay is mounted in the pole top of the electric motor and the magnetic field lines of the electromagnet are closed through the permanent magnet and the pole top of the electric motor.

According to an embodiment of the present invention, it is possible to simplify the control of the electric motor of a drive device to minimize the faults which occur in the control electronics and the structural size of the drive device may be reduced as well.

As a result of the integration of the relay for switching the motor current into the motor housing by using the permanent magnets or pole top of the electric motor as a magnetic return or as counter pole for the electromagnets of the relay, it is possible to reduce the structural volume of the drive device, avoid breakdowns in the control electronics through the switching of the motor currents, reduce costs for the production of the relay and avoid the need for switches for large currents for controlling the electric motor.

According to another embodiment of the invention, the electromagnet of the relay is mounted radially rotatable about an axis in the pole top of the electric motor. The electromagnet preferably consists of a soft iron armature with grooves for the exciter windings of the relay coils and is connected to movable, isolated relay contacts which can swivel between two locally fixed relay contacts in dependence on the energizing polarity of the relay coils.

This embodiment makes it possible to arrange the relay in a space-saving manner and also allows optimum utilization of the space within the electric motor housing by using the magnet system which exists in the electric motor with a selectively larger or smaller switching force in dependence on the current to the relay coils.

The electromagnet can be selectively mounted such that it is concentric with the motor shaft of the electric motor and has two relay coils embedded in the soft iron armature, or alternatively, the rotary axis of the electromagnet can be mounted spaced from the motor shaft and be connected to at least one spring which biases the soft iron armature of the electromagnet towards a center position when there is no current to the relay coils in the stationary magnetic field of the permanent magnet of the electric motor. In the first mentioned case, the neutral contact position is constantly adopted when there is no current to the relay coil or coils through the reluctance forces so that no resetting device is required. In the second-mentioned case the swivel armature is centered by the resetting device, for example, a spring, in the stationary magnetic field and allows a high switching security as well as immunity to vibrations.

The relay armature preferably has flux conducting elements arranged symmetrically relative to its pole axis and whose distance from the counter poles of the permanent magnet of the electric motor is less than the distance of the radial outer face of the relay armature.

Owing to the smaller air gap, a higher magnetic induction prevails at the sites of the flux conducting elements of the soft iron core arranged symmetrically relative to its north-south axis. Through this arrangement in the non-energized state of the relay coils, an increased detent moment and thus a secure zero, or rest, position is produced.

A further embodiment according to the invention is characterised in that the electromagnet consists of a relay armature mounted in a rotary point and having a relay coil wherein the relay armature is connected on its two end sides to a movable relay contact which can swivel in dependence on the current to the relay coil between two stationary contacts connected to the voltage source.

This arrangement is particularly simple to construct and is characterised by a low sensitivity to vibrations. It can be used variably, and by providing corresponding polarity, allows a short circuit of the motor winding in the rest state of the electromagnet of the relay.

Another embodiment according to the invention is characterised in that the relay is designed as a double relay which has two relay armatures mounted such that they are linearly movable in relay coils, each relay armature connected to a movable relay contact and a resetting device. The armatures can thereby be arranged flush and in alignment with each other, and the resetting device can consist of a spring mounted between the opposite end sides of the armatures. Alternatively, the armatures can be connected to a contact disc on which are mounted two slip contacts connected to the motor winding and two slip paths connected to the voltage source wherein the contact disc is connected to a resetting device which centres the contact disc in the neutral central position in the absence of an electric current in the relay coils.

These various arrangements of relays with electromagnets moved in translation and whose movement is converted in part into a rotary movement show the many versatile designs of the basic idea of the solution according to the invention. Depending on the structural design of the relay coils and relay armatures, as well as the arrangement of the resetting devices, the switching relays are characterised by more or less sensitivity to vibrations, larger or smaller switching times and smaller or larger switching forces. Their use depends on the relevant marginal conditions such as place of use, switching security, costs and space available.

The relay coil(s) and associated relay armature(s) can be mounted linearly movable relative to each other so that with a locally fixed relay coil, the relay armature is connected to a movable relay contact, or alternatively, with a locally fixed relay armature the relay coil is connected to a movable relay contact.

The relay armatures can be arranged flush and in alignment with each other and the resetting device can consist of a tensile or compression spring mounted between the opposing end sides of the relay armature.

In the last mentioned embodiment, a resetting element can be dispensed with since the relay armatures are designed as soft iron cores which are attracted by the poles of the permanent magnets of the electric motor in the rest position and thus cause the contacting of the movable relay contacts with the associated locally fixed relay contacts in the rest position without the need for a compression spring which presses the relay armatures apart.

A further embodiment according to the invention is characterised in that the relay is designed as a slide relay mounted across the motor shaft of the electric motor wherein two relay coils are preferably integrated in the relay armature of the slide relay and form an electromagnet which is mounted in the magnetic field between the north and south poles of the permanent magnet of the electric motor.

Preferably, this embodiment is adapted in its geometry in a space saving manner to the existing structural space in the housing of the electric motor. Since the neutral contact position is always adopted when there is no current to the relay coils through the reluctance forces, no resetting device is required to produce the neutral or rest position. Indeed a quantifying of the displacement path can be provided by the differentiated energizing of the relay coils in the case of a separate control of the relay coils.

The control of the relay integrated in the housing of an electric motor depends on the choice of single or double relay and on whether an additional speed detection is to be taken into consideration, for example with an echo sensor.

In order to control a relay coil, the relay coil is mounted in the bridging diagonal of a transistor bridge and is connected to the collectors of each of two series-connected transistors of different conductivity type wherein the emitters of these transistors are connected to positive and negative or mass potential.

In order to control a double relay, the relay coils are connected together by one connection and with each other connection are connected to the load path of a transistor whose base is connected to the control electronics.

If the speed is detected with a sensor element, certain connections can advantageously be used together by connecting the signal output of the sensor element and the relay coils each to a common driver and signal detection phase through which both the control signals for connecting the relay and also through the relevant non-used control line for the relay the signals are transferred, and where applicable, amplified and filtered.

The arrangement of the relay in the pole top of an electric motor for switching the armature current of the electric motor in one or the other direction or for short-circuiting the armature winding includes the following variations:

*a*) Arrangement of the relay anywhere in the pole top of the electric motor;

*b*) Integration of the relay on the motor electronics and arrangement of this integrated structural element in the pole top of the electric motor; and

*c*) Connection of the integrated structural part consisting of the relay and motor electronics with the commutator of the electric motor.

In all the arrangements, the freewheel diodes and the protection circuit for the relay contacts can likewise be integrated in the motor housing. Integrating the relay, which represents the largest structural element inside a control electronics unit, into the housing of an electric motor produces much more freedom of structural space. This furthermore leads to the possibility of installing the control electronics unit at places which would be disregarded as installation sites with the existing relays.

Thus, for example, the control electronics for a seat adjustment device of a motor vehicle can be installed in the trim panel parts or in the seat adjustment switch block. Furthermore all the electric motors of a complex adjustment system such as seat adjustment, window lift electronics unit and the like in a motor vehicle can be connected directly to the dashboard voltage through a ring lead with the control and sensor signal leads guided through a separate lead connection to each relevant connection on the control electronics unit. Thus only one cable tree would be necessary with power and signal leads in the corresponding adjustment device of a motor vehicle.

BRIEF DESCRIPTION OF THE DRAWINGS

Further advantageous designs of the invention are apparent from the claims and from the following description of several embodiments which will be explained in further detail with reference to the drawings in which:

FIGS. 13, 14 and 15 shows another alternate embodiment of a double relay mounted in the pole top of an electric motor with a connection of the movable armature to a rotary disc;

DETAILED DESCRIPTION

In the following the term "electromagnet" is to mean an arrangement of one or more relay coils, one or more relay armatures, the permanent magnet(s) and the magnetic reflux (pole top) wherein the latter, according to the described embodiments of the invention, constituent parts of the electric motor. The term "relay" is to mean the assembly comprising the "electromagnet" and the switching contacts of the relay. Also, the term "mass potential" is to mean an electrical ground.

Figure 1:
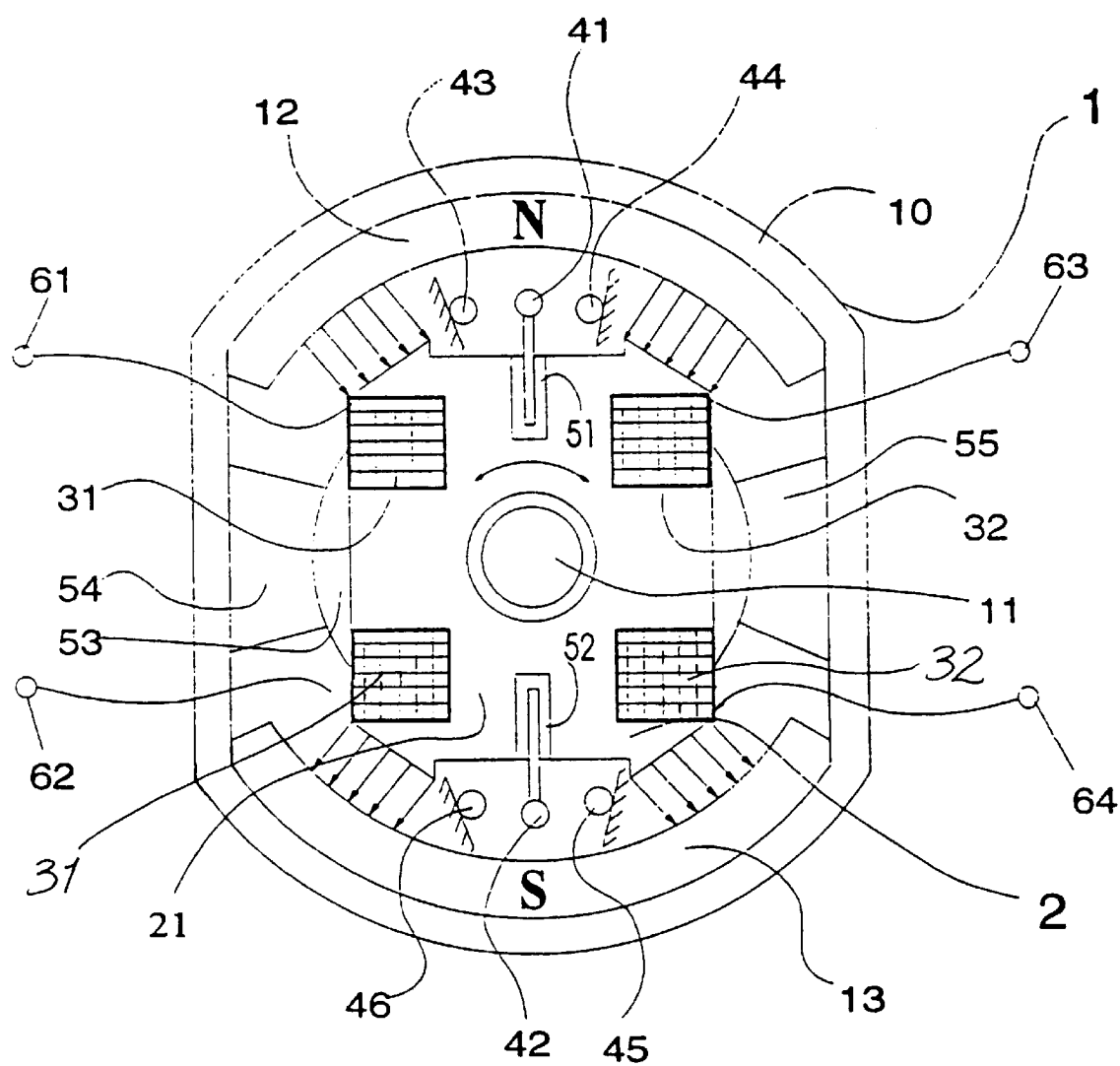
FIG. 1 is a cross-sectional view through a rotary relay according to one embodiment of the invention mounted in the pole top of an electric motor concentric with the motor shaft.

According to the embodiment shown in FIG. 1, a relay 2 integrated in a pole top 10 of an electric motor 1 is formed as a rotary relay set concentric with the motor shaft 11 wherein two relay coils 31,32 are integrated in the relay armature 21 and form an electromagnet which is mounted in the magnetic field of the permanent magnet of the electric motor forming a north pole 12 and a south pole 13. Connections 61, 62, 63, 64 of the relay coils 31, 32 are connected to a control electronics unit (not shown) which through a suitable energizing of the relay coils 31, 32 cause the deflection of the electromagnet of the relay into one or other direction in the magnetic field of the permanent magnet poles 12,13.

The relay armature 21 is connected through an isolator 51,52 to each of two movable relay contacts 41, 42, respectively, opposite which are stationary relay contacts 43, 44, 45, 46 which serve as stops to restrict the deflection of the electromagnet of the relay 2 and which are connected to positive and negative connections respectively of a voltage source (not shown). The movable relay contacts 41, 42 are connected to the motor winding or brushes of the commutator motor. An isolator 53 connected to the relay armature 21 is designed as a rotary rim and mounted in segment bearing dishes 54, 55. The relay armature 21 is preferably formed as a soft iron armature and is adapted in its geometry to match the existing installation space in the housing of the electric motor in a space-saving manner.

In the rest, or neutral, position, the relay 2 stands in the area of the smallest magnetic resistance inside the magnetic field which is formed from the north pole 12 and south pole 13 of the permanent magnet of the electric motor. In order to deflect the relay 2 from this rest, or detent, position a torque must be applied which is proportional to the desired turning angle. The neutral contact position shown in FIG. 1 is always occupied when there is no current to the relay coils 31,32 through the reluctance forces. Accordingly, in this embodiment no resetting device is necessary to produce the neutral or rest position when there is no current in the relay coils 31, 32.

Figure 2:
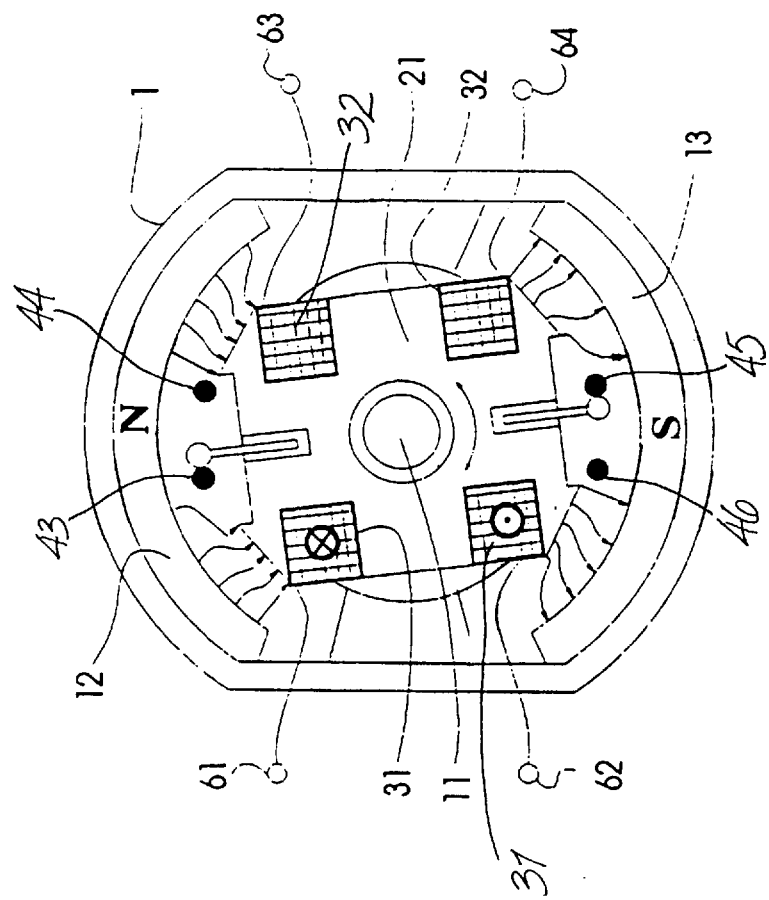
FIGS. 2 and 3 show the rotation of the rotary relay according to FIG. 1 in dependence on the current to the relay coils.

FIG. 2 shows the current supply to the relay coils 31, 32 in the flow direction depicted so that a corresponding polarity is provided which results in a deflection force according to the electrodynamic induction principle. Accordingly, with the current supply or through-flow direction depicted in FIG. 2, the relay 2 is deflected counterclockwise and the movable relay contacts 41, 42 contact the stationary relay contacts 43, 45, respectively. Rotation is carried out either opposite the motor shaft or partially inside the bearing formed from the rotary rim 53 and the segment bearing dishes 54,55. The rotary bearing 53 is thereby a constituent part of the brush holder of the electric motor or a corresponding electronics module, as described above. The movable relay contacts 41, 42 and stationary relay contacts 43, 44, 45, 46 are advantageously likewise an integral constituent part of an electronics module or, in the case of electric motors not controlled through an electronics control unit, a constituent part of the energizing unit.

Figure 3:
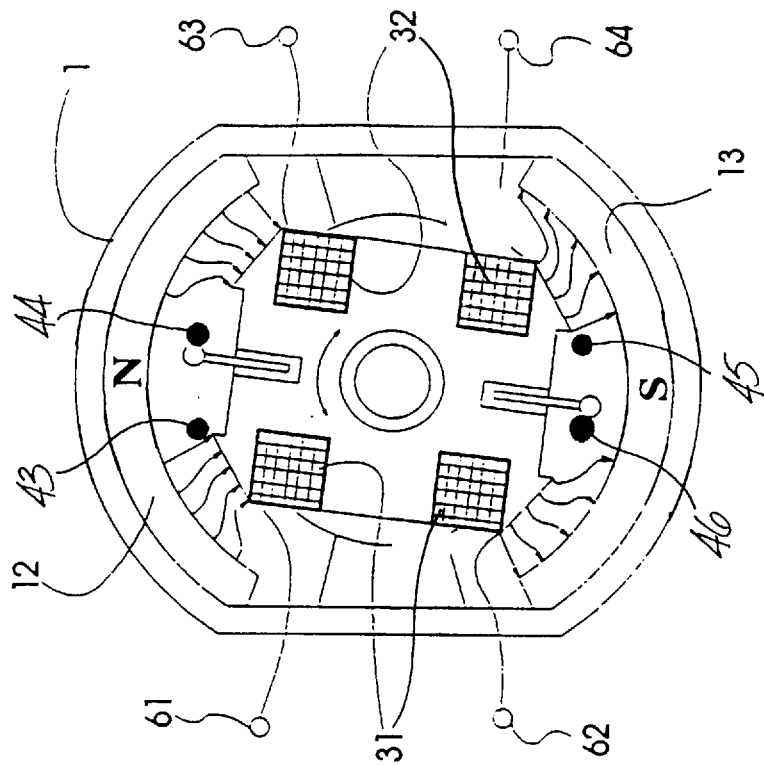

With the energizing direction to the relay coils 31, 32 shown in FIG. 3, the relay armature 21 is deflected clockwise so that the movable relay contacts 41, 42 contact the locally fixed relay contacts 44,46, respectively.

The motor current flows through the motor winding in one or the other direction depending on the deflection of the relay armature 21 in the one or other direction so that a right or left rotation of the electric motor results. In the rest position of the relay 2 according to FIG. 1 the motor winding does not have current flowing through it so that the electric motor is idle. In order to bring the electric motor to a standstill from a right or left rotation, a counter rotation of the electric motor can be produced through a corresponding short-term reverse poling of the control current of the relay coils 31,32, which results in an increased deceleration of the electric motor. In particular when the drive device is used in a window lift mechanism, the increased deceleration produces an opening movement of the window pane which acts as an anti-jamming measure. An increased deceleration of the motor can also be produced by short-circuiting the electric motor.

Figure 4:
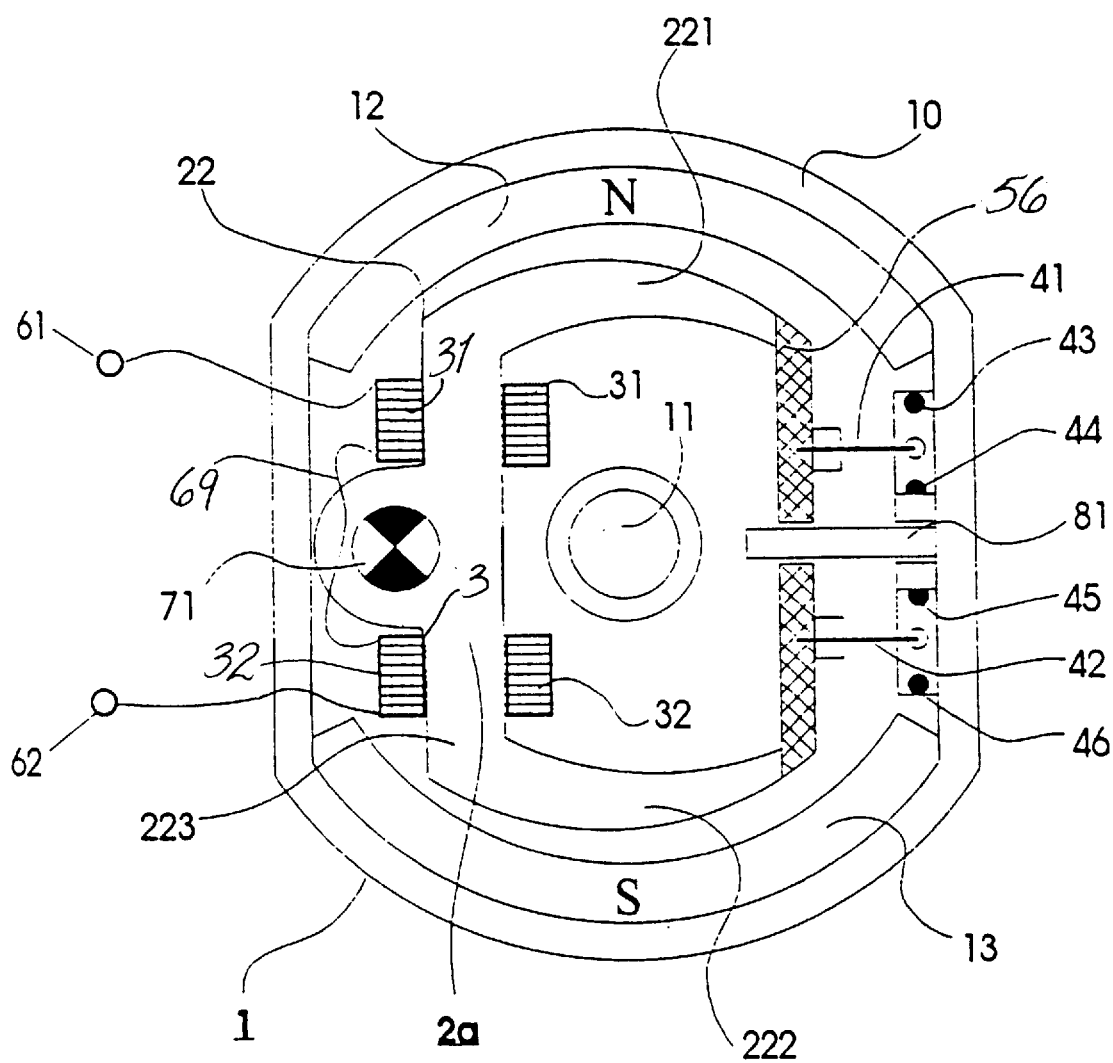
FIG. 4 shows a rotary relay according to another embodiment mounted in the pole top of an electric motor with an eccentric bearing of the electromagnet.

FIG. 4 shows an alternative embodiment of a rotary relay 2a which is mounted in the pole top 10 of an electric motor 1. In this embodiment the relay armature is designed as a swivel armature 22 mounted eccentrically relative to the motor shaft 11. Two arm sections 221 and 222 of the eccentrically mounted swivel armature 22 are opposite the north pole 12 and south pole 13 of the permanent magnet of the electric motor and are connected to a bearing 71 through a base section 223. The base section 223 supports the relay coils 31, 32 which are connected in series with each other through a lead 69 whereas relay coil connections 61, 62 are attached to the control electronics unit (not shown) which provides the energizing direction to the relay coils 31, 32.

The ends of the arm sections 221 and 222 of the eccentrically mounted swivel armature 22 opposite the base section 223 are connected together through an isolation plate 56 in which the movable relay contacts 41, 42 are mounted which are opposite the locally fixed relay contacts 43, 44, 45, 46 like the embodiment shown in to FIG. 1.

The isolation plate 56 serves to hold a resetting element 81 which is designed as a bending spring and which is fixedly connected to the isolator for holding the locally fixed relay contacts 43, 44, 45, 46.

FIG. 4 shows the rest position of the relay 2a with the eccentrically mounted swivel armature 22 in which the swivel armature 22 is maintained in a center position by the bending spring 81 in the stationary magnetic field of the permanent magnet 12, 13. The operating air gaps between the arms of the eccentrically mounted swivel armature 22 and permanent magnets 12, 13 are relatively constant. In this central position the non-excited electromagnet of the relay 2a is balanced and the locally fixed relay contacts 43, 44, 45, 46 are opened so that the motor winding attached to the movable relay contacts 41,42 is currentless.

In order to short-circuit the motor winding, for example to stabilize the rest position or to rapidly brake the motor, the relay contacts 44 and 45 are connected to the relay contacts 41 and 42, wherein the relay contacts 44 and 45 have the same polarity.

By energizing the relay coils 31, 32 the eccentrically mounted swivel armature 22 is swivelled clockwise or counter-clockwise and thus the movable relay contacts 41, 42 are brought into contact with one or other locally fixed contact 43 or 44 and 45 or 46, respectively, so that motor current flows through the motor winding in one or other direction.

Figure 5:
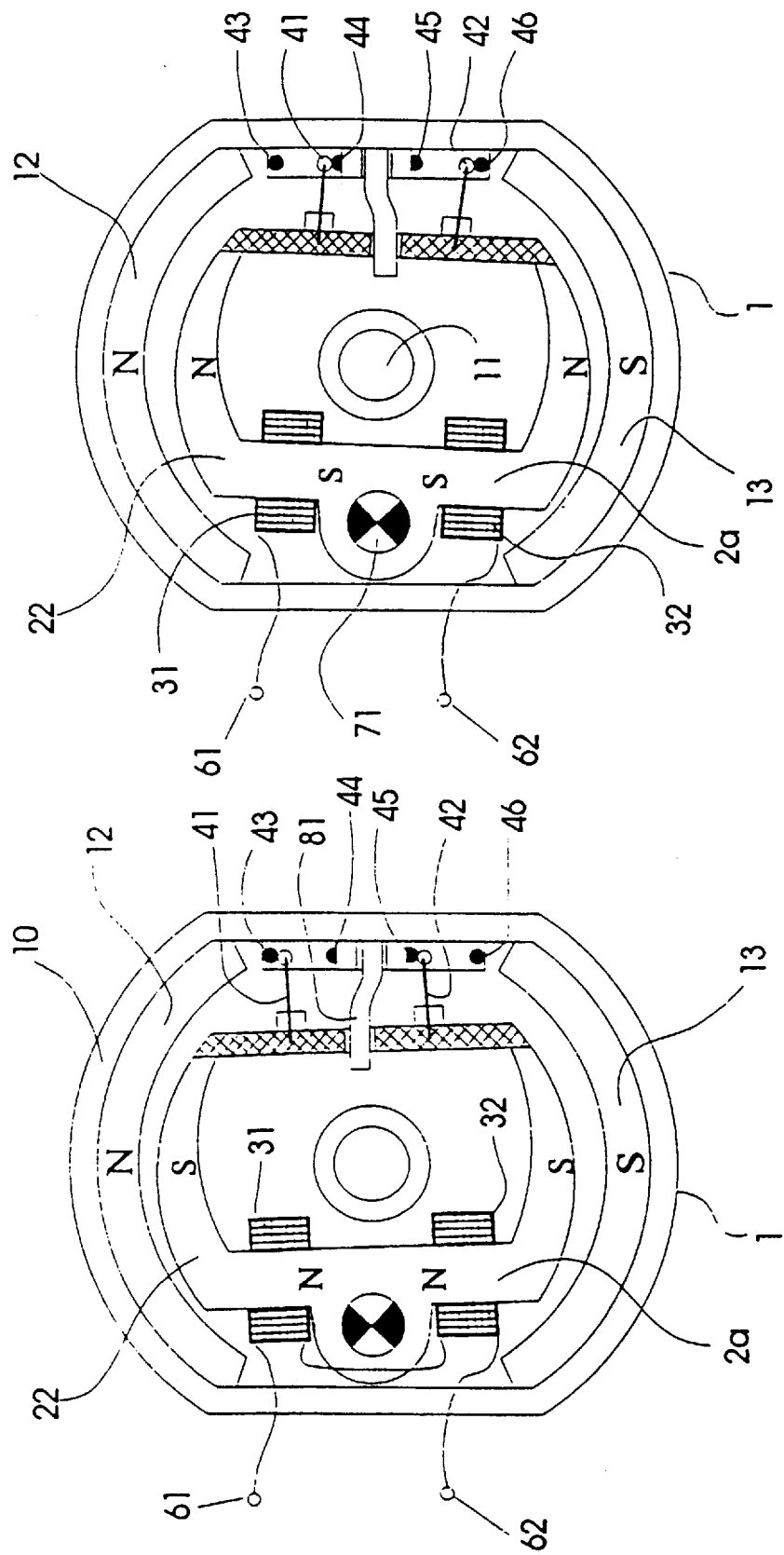
FIGS. 5 and 6 show the rotation of the rotary relay according to FIG. 4 in dependence on the current to the relay coils.

FIG. 5 shows a position of the eccentrically mounted swivel armature 22 as a result of current supplied to the relay coils 31, 32 in the direction where the coil heads of the relay coils 31, 32 facing the swivel bearing 71 form north poles so that south poles are formed on the arms of the swivel armature 22. The north pole 12 of the permanent magnet and the arm of the swivel armature 22 opposite this north pole 12 are thereby attracted whereas on the other side of the swivel bearing 71, the south pole 13 of the permanent magnet and the south pole of the arm of the swivel armature 22 repel each other. The pair of forces thus formed produce a torque as a result of the deflection of the swivel armature 22 on the swivel bearing 71 so that the swivel armature 22 is moved counter-clockwise round the swivel bearing 71. Correspondingly, the movable relay contacts 41, 42 come into contact with the locally fixed relay contacts 43, 45. At the same time the bending spring 81 serving as the resetting element is deflected in the manner shown in FIG. 5.

Figure 6:
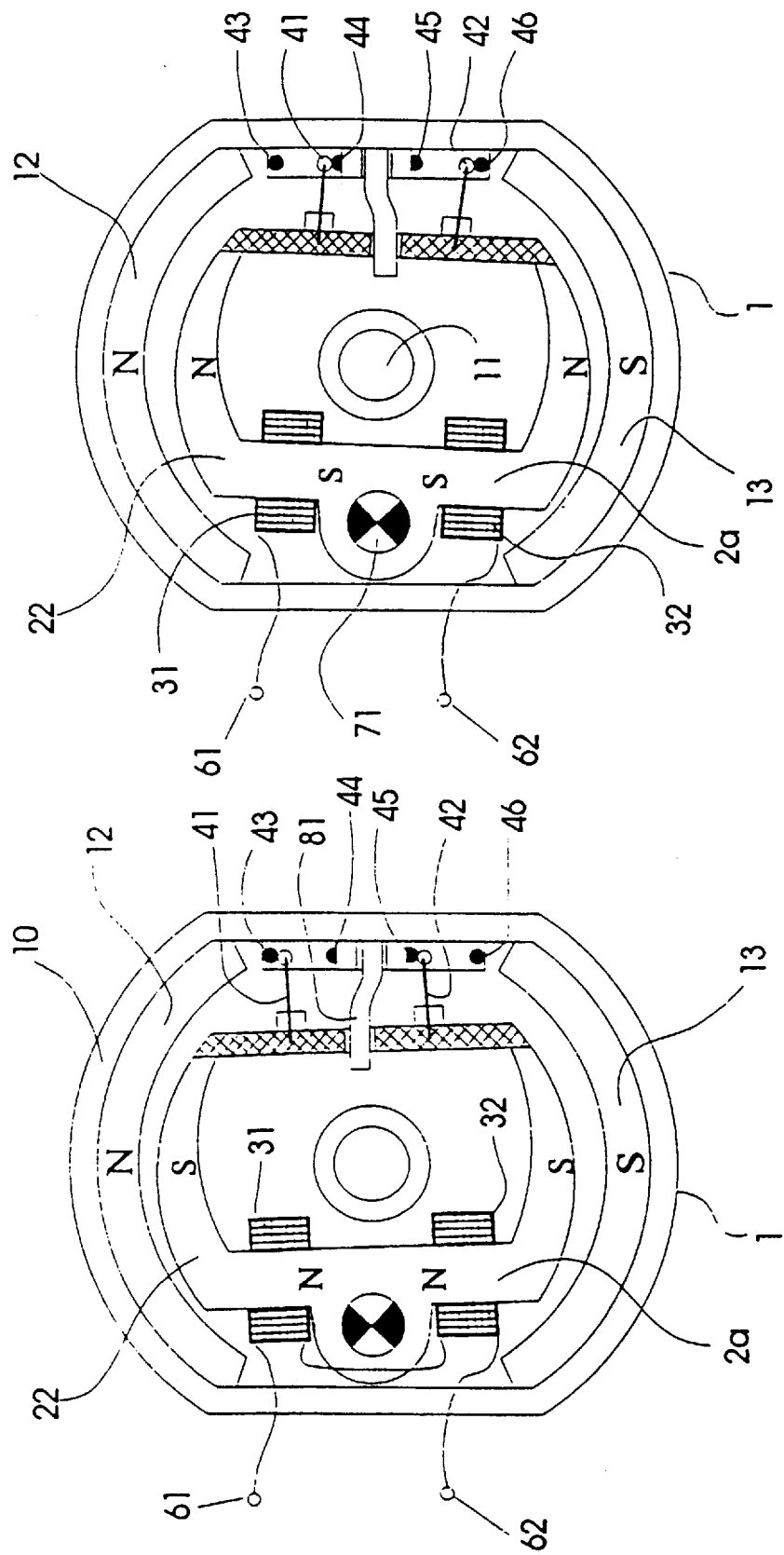

FIG. 6 shows a position of the swivel armature which results from energizing the relay coils 31, 32 in the opposite direction to the energizing direction according to FIG. 5. With this supply of current to the relay coils 31, 32, south poles are formed on the coil heads of the relay coils 31, 32 facing the swivel bearing 71 so that the arms of the swivel armature 22 form north poles accordingly. The like north poles thereby repel whereas the non-like north and south poles on the opposite side attract. The forces resulting therefrom in conjunction with the deflection of the swivel armature 22 on the swivel bearing 71 thereby produce a torque through which the swivel armature 22 is turned clockwise. As a result of this rotation the movable relay contacts 41, 42 contact the locally fixed relay contacts 44, 46 and cause current to be supplied to the motor winding attached to the movable relay contacts 41, 42 in a direction opposite the direction according to FIG. 5.

The configuration of the magnetic circuit geometry is up to the designer and the relevant marginal conditions when constructing an optimized drive machine. The utilization of the pole top 10 as a flow path can also be included in the design of the magnetic circuit geometry.

Figure 7:
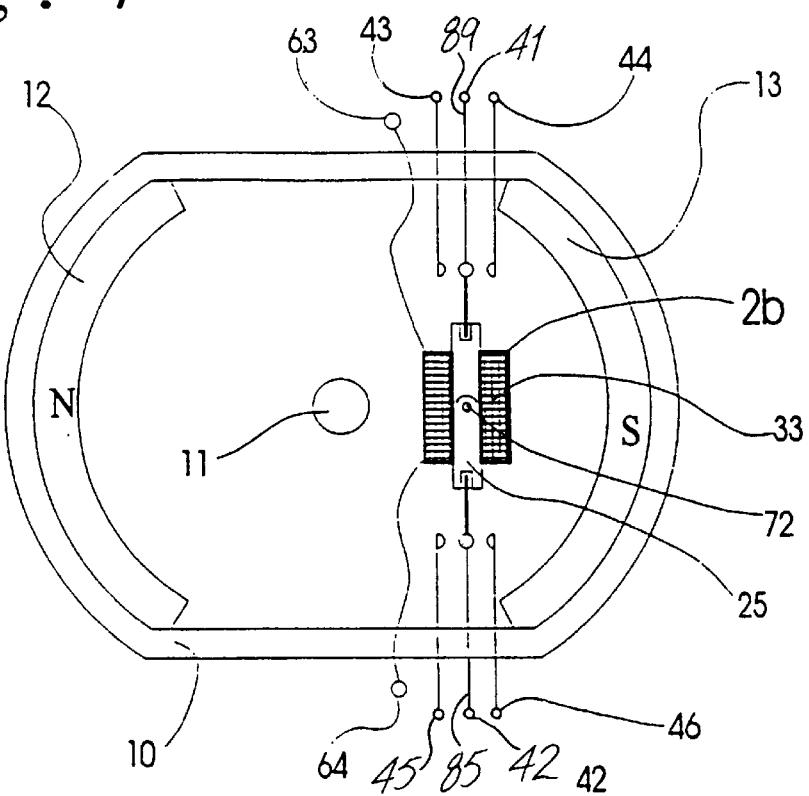
FIG. 7 shows a rotary relay according to another embodiment mounted in the pole top of an electric motor with eccentric positioning of the electronic magnet with a winding and relay armature.

FIG. 7 shows a different embodiment of a rotary relay 2b which is mounted eccentrically relative to the motor shaft 11. In this embodiment, relay armature 25 is fixedly connected to the body of the relay coil 33 and the part of the electromagnet formed from this connection is mounted rotatable about the axis 72. The coil connections 63, 64 are connected to the positive or negative or mass potential depending on the desired swivel action of the relay 2b. The movable relay contacts 41, 42 connected to the end sides of the relay armature 25 are resilient so that when there is no current to the relay coil 33, the movable relay contacts 41, 42 occupy a position in which no contact is closed with the locally fixed relay contacts 43, 44, 45, 46. The contact springs of the movable relay contacts 41, 42 thus pull the relay armature 25 with the relay coil 33 connected thereto into the rest position.

If the coil connection 63 is biased with positive potential and the coil connection 64 with negative or mass potential then the winding of the relay coil 33 is energized with corresponding polarity and a magnetic flux is formed corresponding to the winding direction of the relay coil 33 whose field lines are directed so that they lie in the same direction with the field lines of the magnetic field of the permanent magnet poles 12, 13 of the electric motor. Correspondingly the relay armature 25 with the relay coil 33 of the relay 2b is turned clockwise and the locally fixed relay contacts 43, 46 are moved into contact with the movable relay contacts 41, 42, respectively.

If the relay coil 33 is energized in the opposite direction through a change in the polarity of the coil connections then the relay armature 25 is turned counter-clockwise and the locally fixed relay contacts 44, 45 contact the movable relay contacts 41, 42, respectively, so that the rotary direction of the electric motor connected with the motor winding to the movable relay contacts 41, 42 is changed.

With the embodiment illustrated in FIG. 7, when no current is supplied to the relay coil 33, a rest position of the swivel armature is assumed in which the motor winding of the electric motor is not energized. In a similar way however in this rest position a contact can be closed in order to short-circuit the electric motor.

Figure 8:
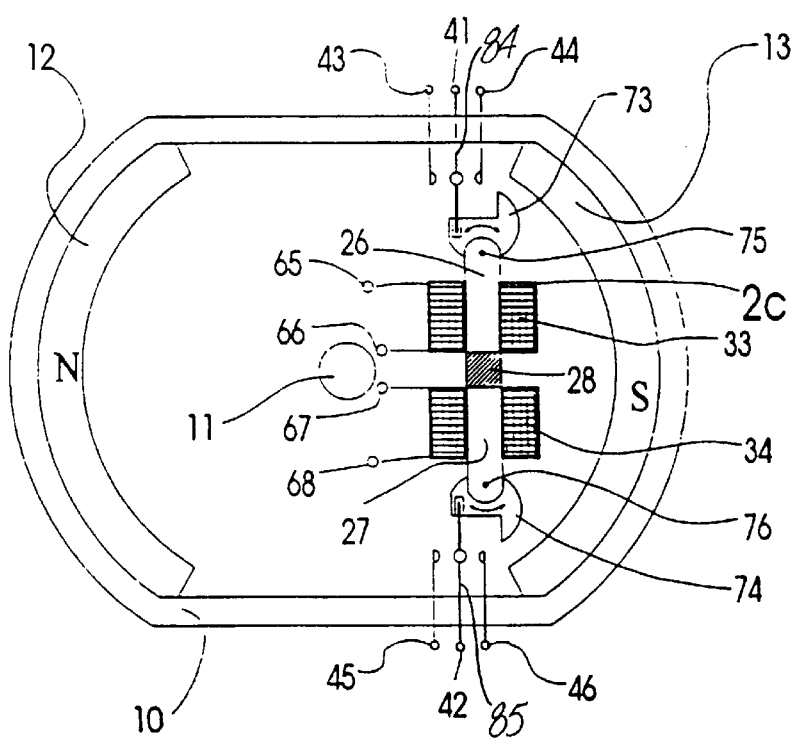
FIG. 8 shows a rotary relay mounted in the pole top of an electric motor similar to the embodiment according to FIG. 7 with two windings and two relay armatures connected together by a non-magnetic material.

Like the arrangement according to FIG. 7, the arrangement illustrated in FIG. 8 has a relay 2c mounted off-center relative to the motor shaft 11 wherein the relay armature consists of two armature parts 26, 27 which are connected together by a non-magnetic material 28 and each support and are fixedly connected to a relay coil 33, 34 perspectively. The relay armatures 26, 27 are connected through two attachments 75,76 to rotary elements 73, 74 which are coupled to the movable relay contacts 41, 42.

The winding connections 65, 66 and 67, 68 of the relay coils 33 and 34 are connected to positive or negative or mass potentials according to the desired swivel action of the electromagnet. Depending on the current supply to the relay coils 33, 34 the rotary elements 73, 74 are swivelled in one or other direction so that the movable relay contacts 41, 42 contact the one or other locally fixed relay contacts 43, 44 or 45, 46 and correspondingly change the rotary direction of the electric motor. The zero position is held by contact springs 84, 85 connected to the relay contacts 41, 42.

FIGS. 9 to 16 show alternate embodiments of drive devices with linearly movable armature of a relay whose adjustment path can also be converted with a corresponding coupling member into a rotary movement.

Figure 9:
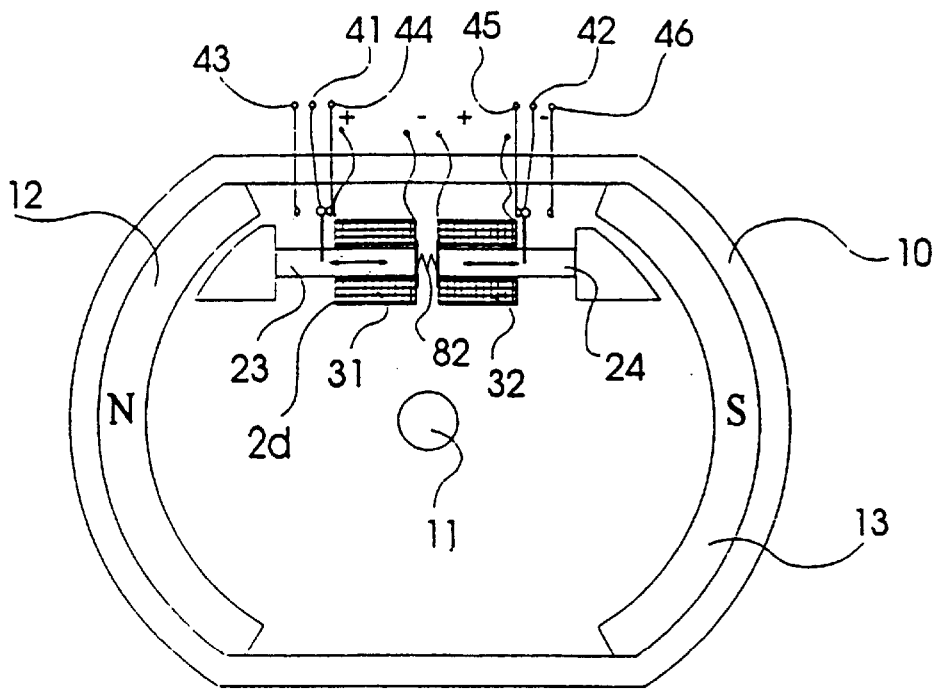
FIG. 9 shows a double relay according to another embodiment mounted in the pole top of an electric motor with linearly movable relay armatures.

FIG. 9 shows a polarized relay designed as a double relay 2d with two translatory movable relay armatures 23, 24 which are linearly movable and are arranged flush and in alignment with each other in locally fixed relay coils 31, 32. The facing end sides of the relay armatures 23, 24 are connected together through a tensile spring 82 whereas the opposing end sides of the relay armatures 23, 24 are adjacent the north pole 12 and south pole 13, respectively, of the permanent magnet of the electric motor.

The relay armatures 23, 24 are fixedly connected to the movable relay contacts 41, 42 which, like the embodiments illustrated and described above, are opposite fixed relay contacts 43, 44, 45, 46 and are connected to the motor winding or brushes of the electro- or commutator motor.

If the relay coil 31 is charged with corresponding polarity then according to the winding direction of the relay coil 31, a magnetic flux is formed whose field lines are directed so that they lie in the same direction with the field lines of the magnetic field of the permanent magnet 12, 13. The relay armature 23 is thereby moved out from the body of the relay coil 31 and the movable relay contact 41 is moved away from the stationary relay contact 44 and up to the stationary relay contact 43 so that one relay contact is opened and the other relay contact is closed. After interruption of the coil current or by reversing the pole of the coil current direction the relay armature 24 is drawn back by the tensile spring 82 up to the stop into the coil body of the relay coil 31 and correspondingly the relay contact previously opened is closed and the relay contact previously closed is opened.

If the winding of the second relay coil 32 is correspondingly energized then the process previously described proceeds in a similar manner with the relay coil 32, the relay armature 24, the movable relay contact 42 connected to the relay armature 24, and the locally fixed relay contacts 45, 46. The supply of current to the motor winding of the electric motor is thereby changed, i.e., a right or left rotation of the electric motor from the rest position is produced. In the rest position of the double relay 2d shown in FIG. 9 the motor winding is short-circuited.

In order to achieve short switching times and to avoid switching errors resulting from external vibrations, the relay armatures 23, 24 should be as light as possible and made of soft iron in to order to reduce remanence. The tensile spring 82 should correspondingly have a sufficiently large spring constant in order to release the relay armatures 23, 24 reliably from the permanent magnets 12, 13 of the electric motor after switching off or reversing the pole of the coil current.

Figure 10:
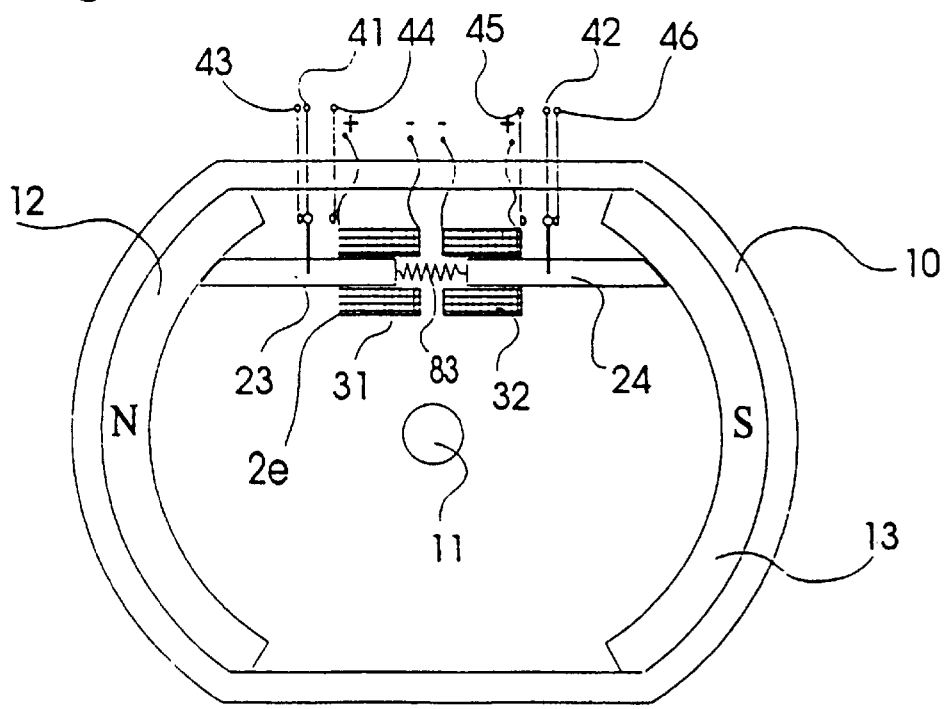
FIG. 10 shows a double relay according to yet another embodiment mounted in the pole top of an electric motor with linearly moveable relay armatures.

FIG. 10 shows a double relay 2e analogous to the double relay 2d shown in FIG. 9. A compression spring 83 mounted between the relay armatures 23, 24 presses the relay armature 23, 24 provided with the polarity [poling entered] depicted in FIG. 10 in the direction of the correspondingly poled north pole 12 and south pole 13 of the permanent magnets of the electric motor. Thus FIG. 10 shows the rest position in which relay armatures 23, 24 are forced away from each other by spring 83. With corresponding current supply to the relay coils 31, 32, the relay armatures 23, 24 are drawn against the action of the compression spring 83 into the relay coils 31, 32. Correspondingly, the relay armatures 23,24 contact the movable relay contacts 41,42 connected therewith to the locally fixed relay contacts 44 and 45. In the rest position shown in FIG. 10, the movable relay contacts 41, 42 are connected to the locally fixed relay contacts 43 and 46 to provide a desired rotary direction of the electric motor.

According to an alternate embodiment, the compression spring 83 shown in FIG. 10 is omitted since the relay armatures 23, 24 formed as soft iron cores are attracted by the poles 12 and 13 of the permanent magnet of the electric motor in the rest position and thus cause a contact between the movable relay contacts 41, 42 and the locally fixed relay contacts 43, 46 without a compression spring 83 being necessary to press the relay armatures 23, 24 apart.

Figure 11:
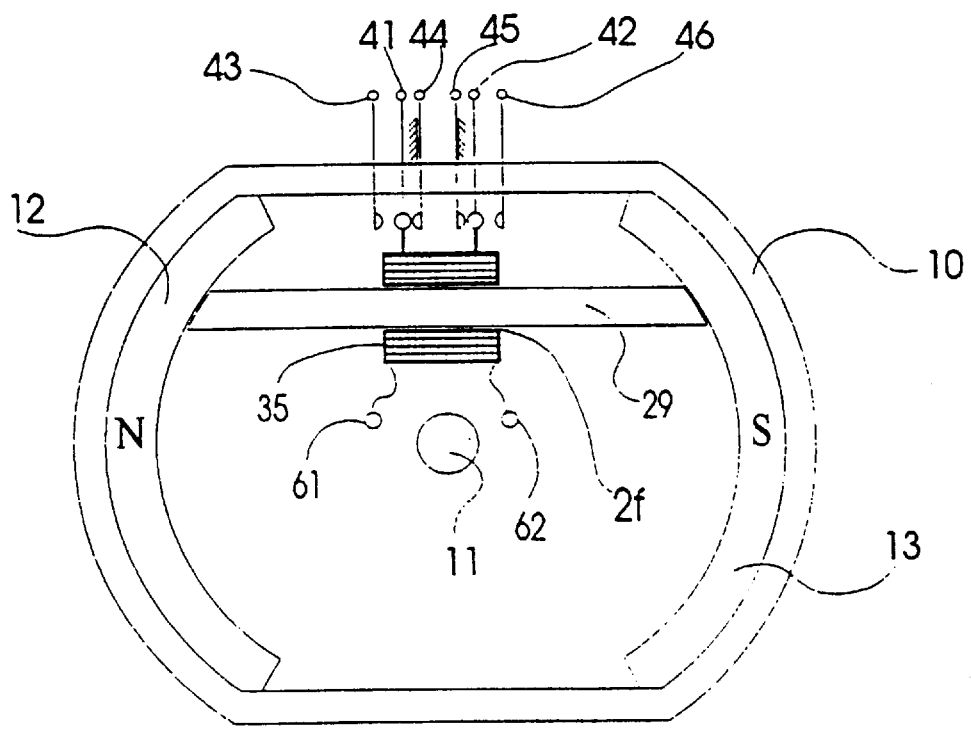
FIG. 11 shows a relay according to another embodiment mounted in the pole top of an electric motor with fixed armature and movable relay coil.

FIG. 11 shows a relay 2f which has a relay armature 29 mounted in a fixed manner between the poles 12, 13 of the permanent magnet of the electric motor. On the armature 29 is movably mounted a relay coil 35 which is displaceable in the longitudinal direction of the relay armature 29. In this embodiment, the relay coil is connected with the movable relay contacts 41, 42 and the relay coil 35 is moved in one or other direction depending on the current supply to the relay coil 35 through its winding connections 61,62 with corresponding design of a magnetic field. Since the locally fixed relay contacts 43, 44 and 45, 46 are designed as resilient contacts wherein the spring path of the inner locally fixed relay contacts 44, 45 is restricted by stops (shown symbolically), with no deflection of the relay coil 35 into one or other direction, that is, the rest or neutral position, the movable relay contacts 41, 42 are connected to the locally fixed relay contacts 44, 45 for example to short circuit the motor winding according to the position shown in FIG. 11, or with a corresponding deflection, the movable middle contacts 41, 42 are connected to the locally fixed relay contacts 44, 46 and 45, 43 so that a right or left rotation of the electric motor results.

In a further alternate embodiment, FIG. 11 can be modified so that two relay armatures and two relay coils are provided similar to the arrangement according to FIG. 10. In such an arrangement the two relay armatures are connected together through a non-magnetic material and the relay coils are mounted longitudinally displaceable on the relay armatures so that a contacting of the relay contacts takes place corresponding to the arrangement in FIG. 10 when a suitable current is sent to the two relay coils.

Figure 12:
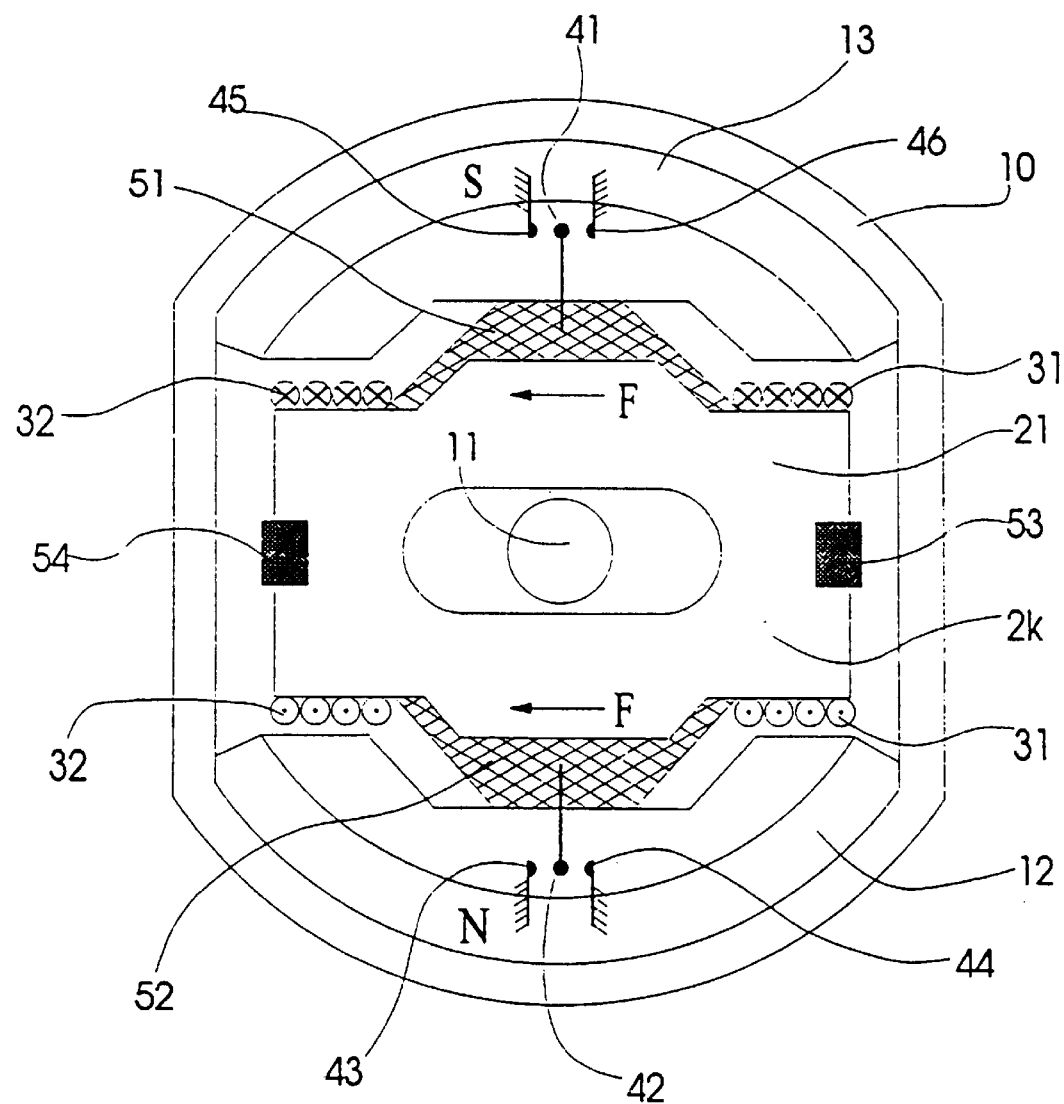
FIG. 12 shows a slide relay according to another embodiment integrated in the pole top of an electric motor and mounted across the motor shaft.

The relay 2 integrated in the pole top 10 of an electric motor and shown in FIG. 12 is designed as a slide relay 2k mounted across the motor shaft 11. Two relay coils 31, 32 shown in cross-section are integrated in the relay armature 21 of this slide relay 2k and form an electromagnet which is mounted in the magnetic field of the permanent magnet of an electric motor, the permanent magnet having a north and south pole 12, 13.

The connections of the relay coils 31, 32 are connected to a control electronics unit (not shown) which through suitable energizing of the relay coils 31, 32 causes the deflection of the relay 2k by 90 degrees across the stationary magnetic field of the permanent magnets 12, 13 in one or other direction.

The relay armature 21 is connected through an isolator 51, 52 to each of two movable relay contacts 41, 42 opposite which are stationary relay contacts 43, 44 and 45, 46, respectively. The stop restriction is provided by two isolator bodies 53, 54. The movable relay contacts 41, 42 are connected to the motor winding or to the brushes of the commutator motor. Each of the stationary relay contacts 43, 44, 45, 46 are attached with either a positive and negative connection to a voltage source. The isolation parts 51, 52 serve additionally as slide elements.

Preferably, the relay armature 21 is designed as a soft iron armature and in its geometry matches the existing structural space and fits space-savingly in the housing of the electric motor. In the rest or neutral position the relay 2k stands in the area of the smallest magnetic resistance inside the magnetic field formed from the north pole 12 and south pole 13 of the permanent magnet of the electric motor. In order to deflect the relay 2k from this detent position a shear force must be applied which is proportional to the displacement path.

The neutral contact position shown in FIG. 12 is always adopted in the event of non-energization of the relay coils 31, 32 through the reluctance forces so that in this arrangement no resetting device is required to produce the neutral, or rest, position. The shear force F is produced during energizing of the relay coils 31, 32. The polarity or current direction determines the displacement direction. The relay coils 31, 32 can be connected in series or in parallel and can be excited separately or together. A differentiated energizing of the relay coils 31 and 32 with a separate control of the relay coils 31, 32 thereby allows the displacement path to be quantified.

Figure 13:
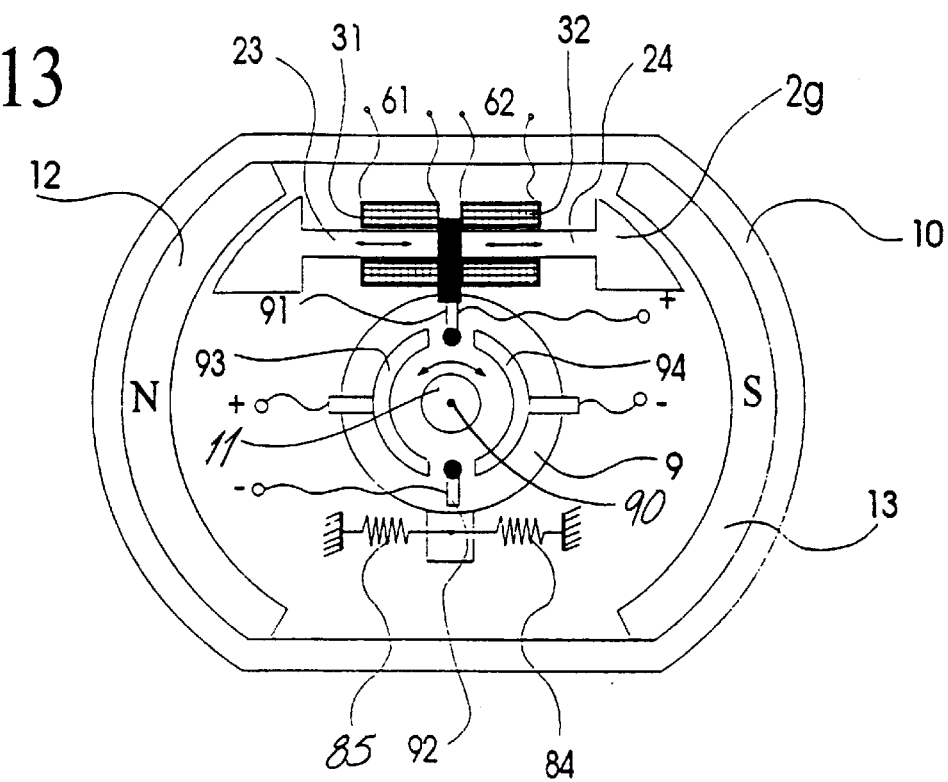
FIG. 13 shows an embodiment of a double relay mounted in the pole top of an electric motor with a connection of the movable armature to a rotary disc.

In FIG. 13 an embodiment of a relay 2g in a drive machine is illustrated wherein the relay coils 31, 32 fixedly connected to the relay armatures 23, 24 are mounted in the magnetic field of the permanent magnet poles 12, 13 of the electric motor. The unit of the relay 2g formed from the relay armatures 23, 24 and relay coils 31, 32 is fixedly connected to a rotary disc 9 which is rotatable about an axis 90 and has two contact paths 93, 94 which are contactable with slip contacts 91, 92 to which the motor winding or brushes of the electric motor are attached. The voltage source is attached to the contact paths 93, 94.

The rotary disc 9 is additionally connected to a resetting element which consists in this embodiment of two fixedly attached springs 84, 85. The rotary axis 90 of the rotary axis 9 coincides in this embodiment with the motor shaft 11 without being fixedly connected to same.

By placing a corresponding polarity on the coil connections 61 of the relay coil 31, the relay coil is energized and a magnetic flux is formed in the associated relay armature 23 which enters into alternating action with the magnetic field of the permanent magnets 12, 13 and causes a corresponding counter-clockwise deflection of the electromagnet formed from the relay coil 31 and relay armature 23 so that the slip contacts 91, 92 are moved onto the contact paths 93, 94 thus resulting in a corresponding energizing of the motor winding of the electric motor.

If analogous with this the relay coil 32 is set through the coil connection 62 to a corresponding polarity the relay coil 32 is energized accordingly and in alternating action with the magnetic field of the permanent magnets 12, 13 of the electric motor a clockwise deflection is carried out by the electromagnet formed from the relay coil 32 and relay armature 24 so that the motor winding of the electric motor connected to the contact paths 93, 94 undergoes a change of polarity.

The two springs 84, 85 draw the rotary disc 9 back into the rest position when the relay coils 31, 32 are not energized. In this position the slip contacts 91, 92 are located outside of the contact paths 93, 94 and the electric motor connected to the contact paths 93, 94 is without power. Also in this arrangement a short circuiting of the electric motor in the rest position is possible through an additional contact path which connects the slip contacts 91, 92 in the rest position.

Figure 14:
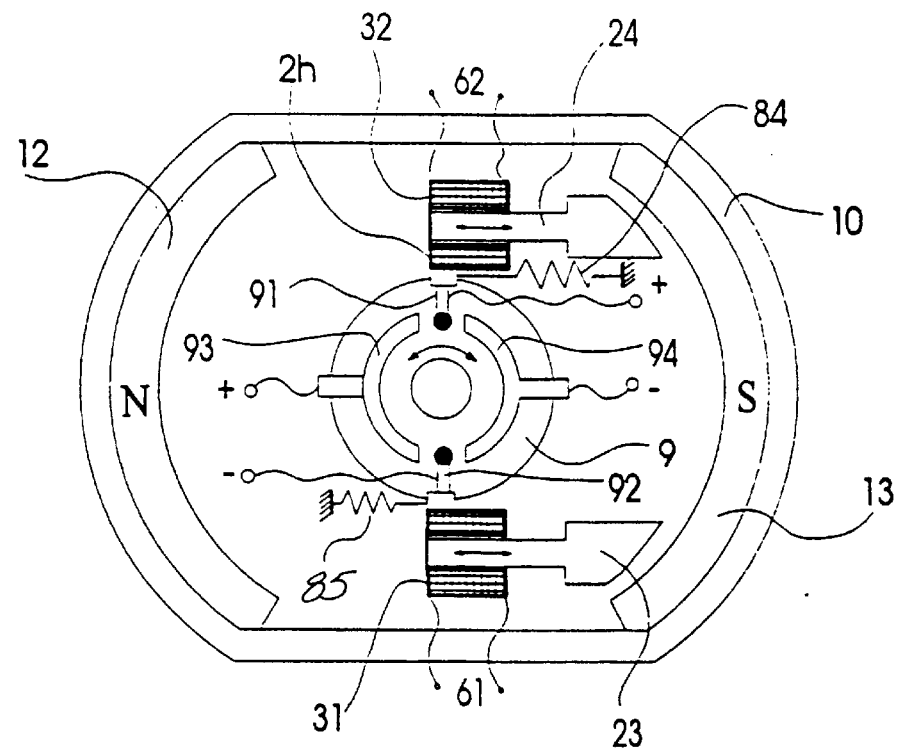
FIG. 14 shows an alternate embodiment of a double relay mounted in the pole top of an electric motor with a connection of the movable armature to a rotary disc.

FIG. 14 shows a variation of the embodiment according to FIG. 13 where the relay coils 31, 32 and relay armatures 23, 24 of the relay 2h are arranged symmetrically with the rotary axis of the rotary disc 9, i.e., with the motor shaft 11. This embodiment is distinguished from the embodiment according to FIG. 9 by a low sensitivity to vibrations. Connecting the relay armatures 23, 24 to the relay coils 31, 32 produces electromagnets with comparatively large mass which lead to greater switching times.

Figure 15:
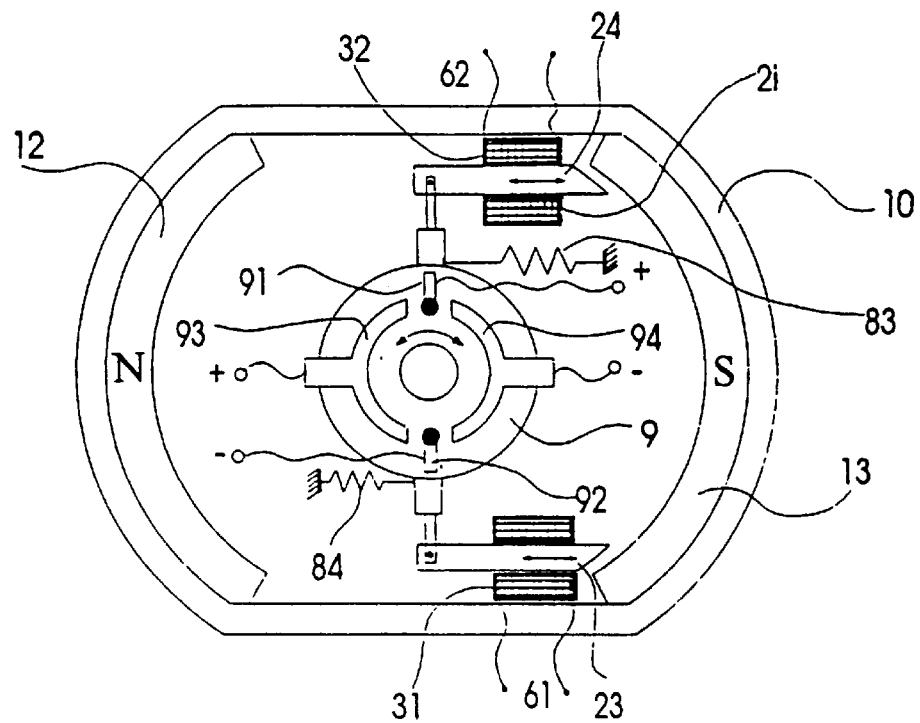

In order to reduce the switching times, according to an embodiment of a relay 2i shown in cross-section in FIG. 15, the relay armatures 23, 24 are mounted for translatory movement relative to the relay coils 31, 32 holding the armatures 23, 24 in order to reduce the movable masses. The method of functioning of the devices according to FIGS. 14 and 15 corresponds to the method of functioning of the embodiment according to FIG. 13 described above.

Figure 16:
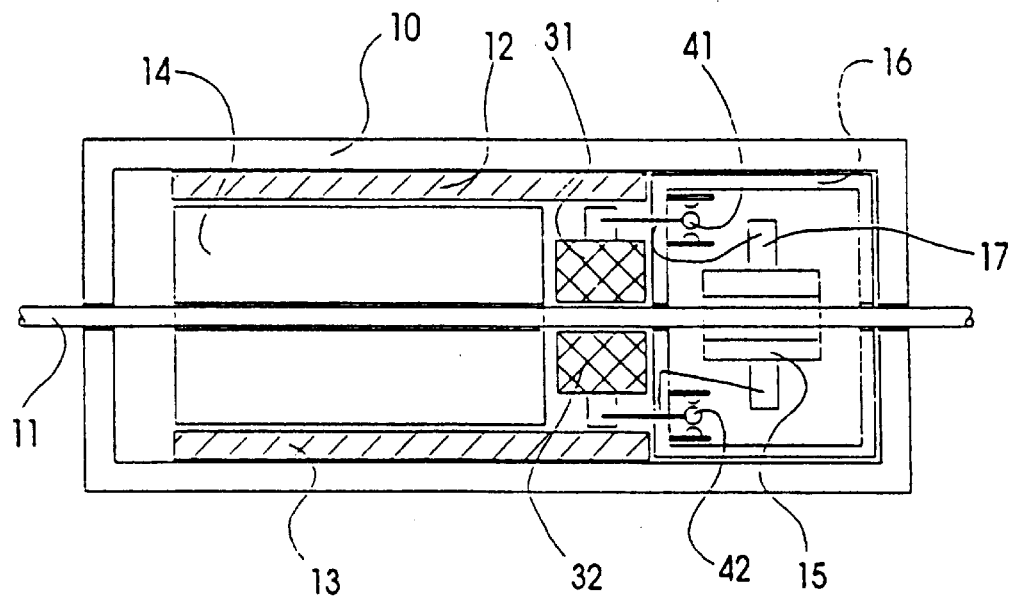
FIG. 16 is a longitudinal sectional view through the arrangement according to another embodiment showing the electric motor.

The embodiment illustrated in FIG. 16 shows the arrangement of the relay between the permanent magnets 12, 13 and the pole shoe of the electric motor and between the rotor 14 and the commutator 15 of the electric motor. The relay coils 31, 32 are fixed on the brush holder 16 of the commutator 15 and are electrically connected to the brushes 17 as well as being mounted radially between the permanent magnets 12, 13 of the motor armature. For a particularly space-saving arrangement, the relay coils 31, 32 and the relay armatures 23, 24 guided in the relay coils 31, 32 can be made with a flat construction. The movable contacts 41, 42 connected to the relay armatures 23, 24 as well as the locally fixed contacts 43, 44, 45, 46 are likewise located on the brush holder 16.

FIG. 16 clearly shows the compact construction of the drive machine which is formed from the electric motor and relay and which needs only a low current energizing the relay coils 31, 32 and discharged from the control electronics unit for control.

Figure 17:
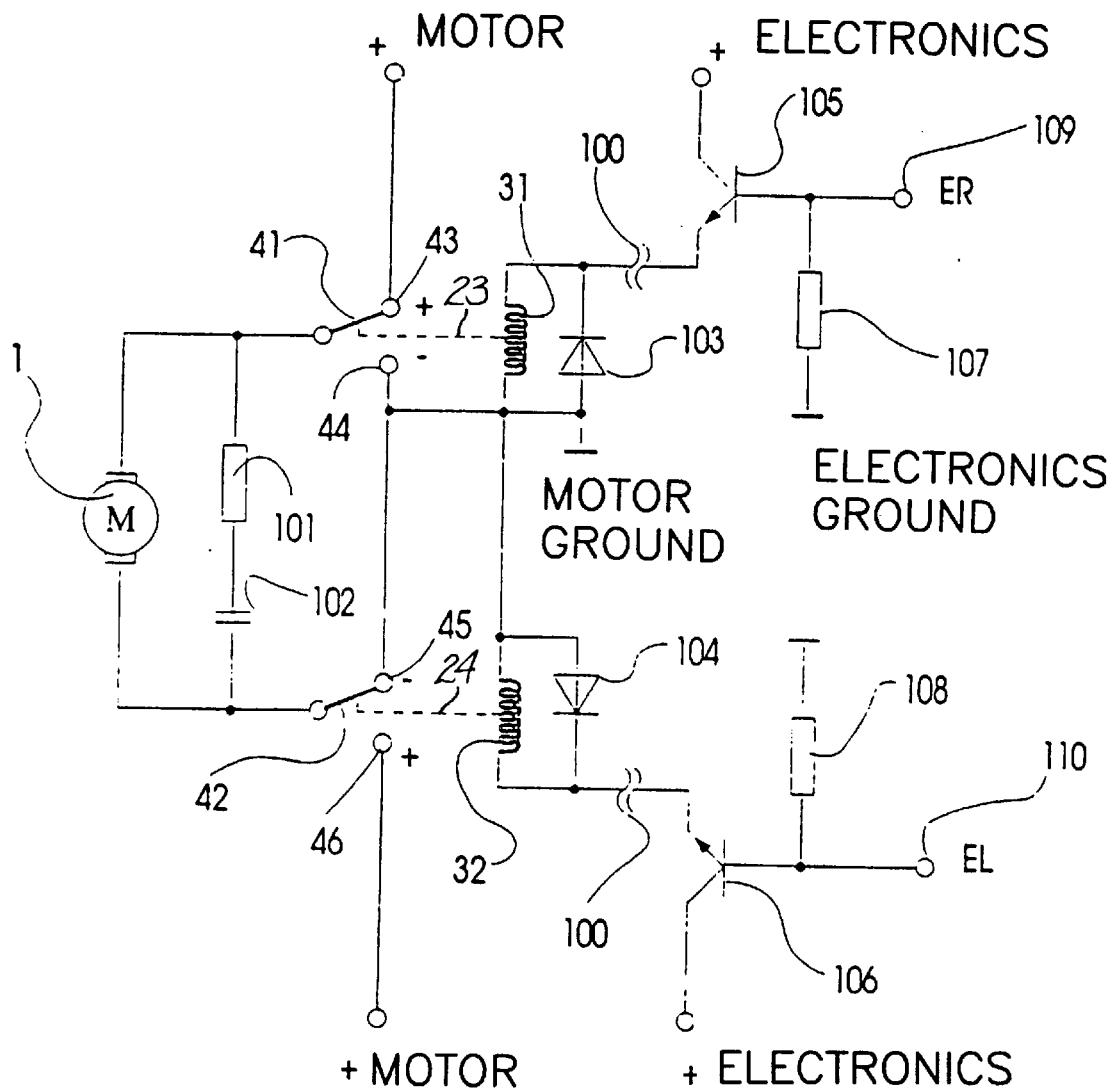
FIG. 17 is a circuit diagram for controlling a double relay according to one embodiment.
Figure 18:
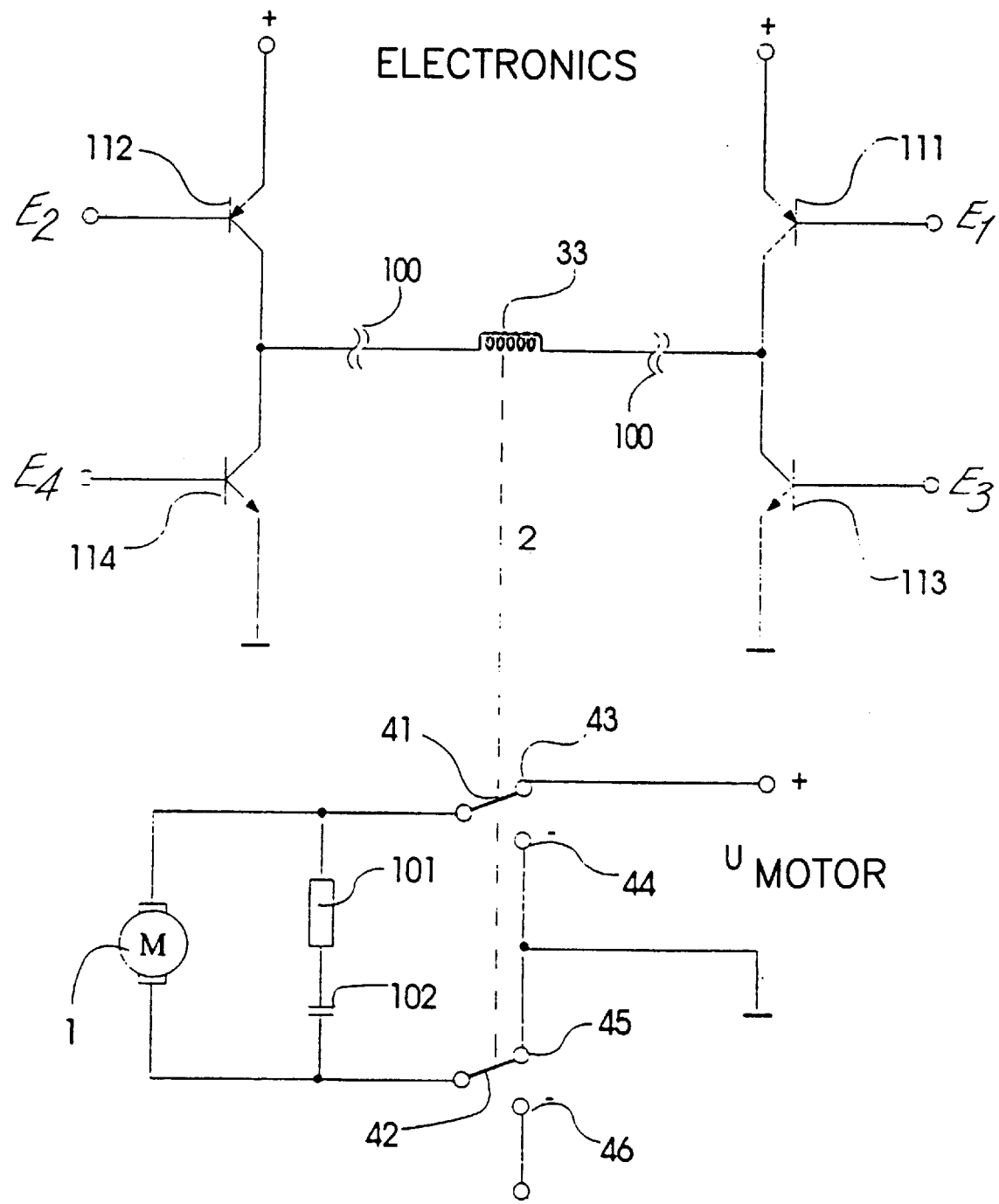
FIG. 18 is a circuit diagram for controlling a single coil relay.
Figure 19:
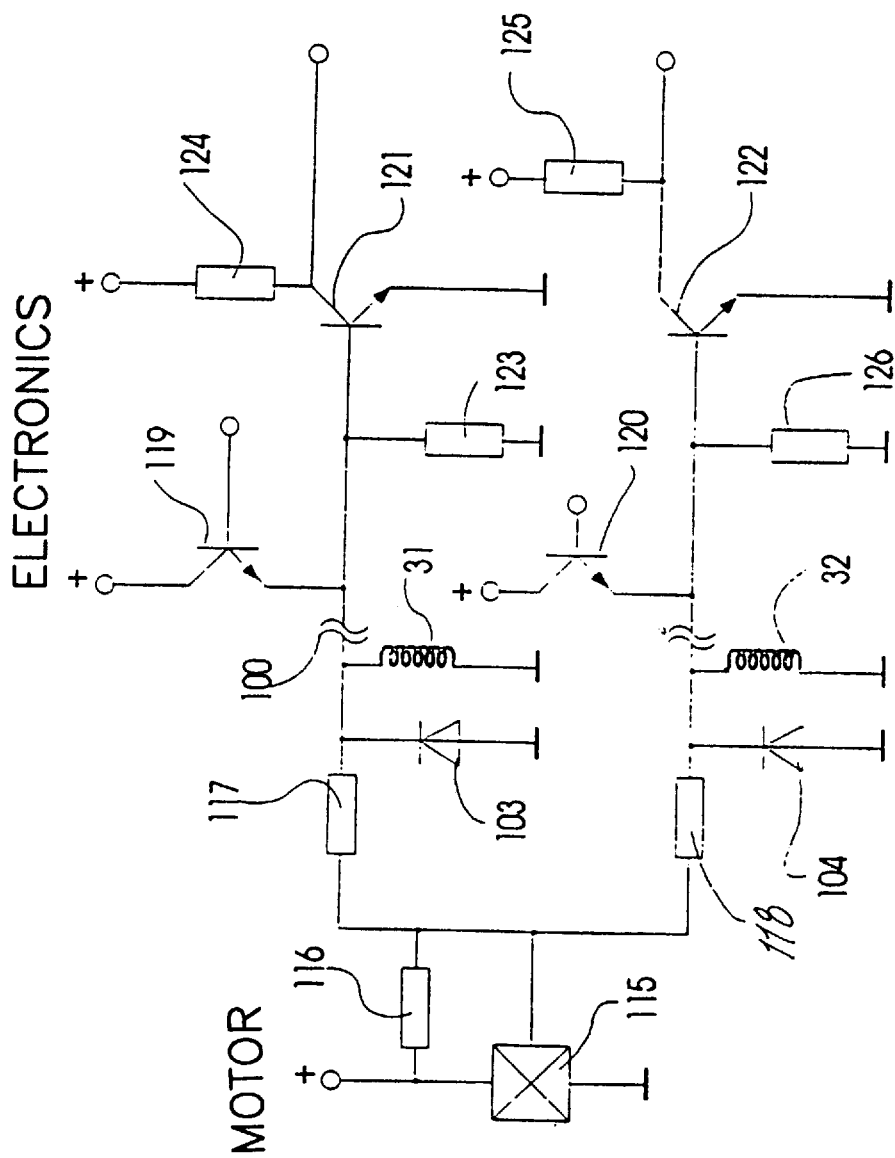
FIG. 19 is a circuit diagram for controlling a double relay with integration of an echo sensor.

FIGS. 17 to 19 show various embodiments for controlling the relay integrated in the electric motor as described below.

FIG. 17 illustrates a circuit for controlling the relay integrated in a housing of an electric motor and having a double coil wherein a driver stage is provided for each relay coil.

The separation between the drive machine and the electronics control unit takes place at the point marked by reference numeral 100. The motor housing contains the electric motor 1 with a parallel-connected spark extinguishing circuit for the switching contacts, the movable relay contacts 41, 42 which are connected to the electromagnets 31, and 32, by relay armatures 23, 24, respectively, and produce a connection with positive or negative potential through the stationary relay contacts 43, 44, 45, 46. The spark extinguishing circuit is in this embodiment comprised of the series connection of a resistance 101 and a capacitor 102 which may also include a varistor or Z-diodes or of individual resistance and capacitor elements. Freewheel diodes 103,104 are connected in parallel with the relay coils 31, 32 and their anodes are connected to mass potential.

The electronic control unit contains two transistors 105, 106 for each driver stage, the collectors of which are connected to positive potential of the electronics voltage. The bases of the two transistors 105, 106 are biased with the electronic control signal for clockwise running 109 and the electronic control signal for counter-clockwise running 110 and are connected through each resistance 107, 108 respectively, to mass potential of the electronics circuit.

In the circuit arrangement illustrated in FIG. 17 both the freewheel diodes 103, 104 and the spark extinguishing circuit for the contacts, consisting in this example of the series connection of the resistance 101 with the capacitor 102, are integrated in the motor housing.

The circuit illustrated in FIG. 18 serves to control a relay with a relay coil 33. In this circuit arrangement the relay coil 33 is mounted in a transistor bridging circuit with the transistors 111, 112, 113 and 114 wherein the interface between the motor housing and the electronics control unit is provided at the sites of reference numerals 100. The component parts integrated in the housing of the electric motor 1 correspond, with the exception of the freewheel diodes, to the structural elements illustrated in FIG. 17.

The transistors 111, 112, 113, 114 mounted in the transistor bridging circuit are connected on the emitter side to positive or mass potential whereas the collectors lead to the bridging diagonals having the coils. The bases of the transistors are biased with control signals E1 to E4 and are controlled so that the polarity of the relay coil 33 is changed in dependence on the desired switching process in that the energizing of the relay coil 33 is undertaken alternately through the switched on transistors 112 and 113 or transistors 111 and 114.

FIG. 19 shows a circuit for controlling a relay integrated in the housing of an electric motor with an evaluation of the signal discharged by an echo sensor for detecting the rotational speed and/or the number of revolutions of the electric motor. By integrating a double relay in the housing of the electric motor there are on the outside four connections of which two serve for applying the operating voltage and two serve to control the rotary direction or release an echo signal. The two connections normally required for evaluating the signal discharged by the echo sensor can thus be integrated in the circuit so that with one relay with two relay coils there is the possibility of using certain connections together.

The partition between the motor housing and electronics control unit is produced at the site of reference number 100 and separates the component parts, relay coils 31, 32, freewheel diodes 103, 104, resistances 116, 117, 118 and the echo sensor 115 coupled with the electric motor, all integrated in the motor housing from the electronics control unit. The electronics control unit consists of a driver phase associated with each of the relay coils 31, 32 with two transistors of the same conductivity type 119, 120, 121, 122, each having its collector connected to a positive potential of the electronics circuit. The resistances 123, 126 connect the connection of the emitter of the one transistor 119 or 120 with the base of the other transistor 121 or 122 to mass potential of the electronics circuit whereas the two resistances 124, 125 attached to the collectors of the transistors 121, 122 bias these with positive potential of the electronics. The control of the relay is undertaken through signal leads E1 and E2 whereas the echo sensor output signals are discharged through connections A1 and A2 to the electronics control unit.

The function of the circuit illustrated in FIG. 19 for controlling the motor switch and evaluating the output signal of the echo sensor will now be described in further detail.

The relay coils 31, 32 are controlled by the electronics control unit through the transistors 119, 120 analogous with the circuit arrangement according to FIG. 17. Since only one lead is required for controlling the relay coils 31, 32 for each rotary direction, the other leads are unused at this instant. The signal released by the echo sensor 115 is switched onto this corresponding free lead through the resistances 117, 118 and is amplified through the transistors 121, 122 and passed onto the electronics evaluating unit through the connections A1, A2. The transistors 119, 120 present in each driver phase are each blocked on the lead on which the signals discharged by the echo sensor 115 are transferred.

In the circuit arrangement according to FIG. 19 the transistors 121, 122 are omitted if the input phases of the electronics evaluating unit are designed accordingly.

The echo sensor 115 is attached to the operating voltage of the electric motor wherein the resistance 116 serves to switch the open collector output of the echo sensor 115. So that the sensor signal voltages discharged from the echo sensor 115 are not so great that each non-used relay coil 31 or 32 is controlled, the echo signal voltage is fixed with the resistances 116, 117 and 118 and the resistances 123, 126.

Where applicable a filter arrangement connected on the output side can satisfactorily produce the echo signal again in the event of distortions occurring through the relay coils.

We claim:

1. A drive device for use in combination with an electric motor with a permanent magnet and a pole top, the drive device comprising:

a relay for switching a motor current through the electric motor, comprising at least one electromagnet comprising a relay coil and a relay armature, and at least one relay contact, wherein the relay is mounted in the pole top of the electric motor, and wherein the magnetic field lines generated by the electromagnet are closed through the permanent magnet and the pole top of the electric motor.

2. The drive device according to claim 1, wherein the relay armature and the relay coil are rotatably mounted about an axis in the pole top of the electric motor.

3. The drive device according to claim 1, wherein the relay armature comprises a soft iron armature with a plurality of grooves for a plurality of exciter windings of the relay coil and is connected to a plurality of movable, isolated relay contacts, each of which can move in dependence on an energized state of the relay coil between two adjacent stationary relay contacts.

4. The drive device according to claim 3 further comprising a second relay coil, wherein the relay armature is mounted concentrically with a motor shaft of the electric motor and has the two relay coils embedded in the relay armature.

5. The drive device according to claim 3, wherein an axis of the relay armature is set spaced from a motor shaft of the electric motor and is connected to at least one resetting element which biases the relay armature towards a center position in a stationary magnetic field of the permanent magnet of the electric motor in which the relay coil is in an unenergized state.

6. The drive device according to claim 5 further comprising a second relay coil, wherein the relay armature is forked and has two sections, one of the two sections opposite a north pole of the permanent magnet and the other second opposite a south pole of the permanent magnet, wherein each of the two sections is connected on a first side to a base section supporting the two relay coils and connected to the axis and on a second side is connected to an isolator part which supports the movable, isolated relay contacts and is connected to the at least one resetting element.

7. The drive device according to claim 1, wherein the relay armature has a plurality of flux conducting elements arranged symmetrically relative to the axis wherein the distance of the plurality of flux conducting elements from the counter poles of the permanent magnet of the electric motor is smaller than the distance of the counter poles of the permanent magnet from the radial outer face of the relay armature.

8. The drive device according to claim 1, wherein the relay armature is mounted on a rotary point and is connected to the relay coil, and wherein the relay armature is connected on each of two end sides to a movable relay contact which can move with the relay armature, in dependence on the energized state of the relay coil, between two stationary relay contacts adapted for connection to a voltage source.

9. The drive device according to claim 1, wherein the relay is mounted eccentrically relative to the motor shaft, wherein the relay armature comprises two armature parts connected together through a connecting part comprising a non-magnetic material, each supporting a relay coil fixedly connected thereto, and wherein each of said armature parts is connected at the end opposite their common connection to a rotary element which is coupled with a the movable relay contact.

10. The drive device according to claim 3, wherein the relay armature is movable linearly relative to the relay coil, and wherein the relay coil is fixed and the relay armature is movable and is connected with one of the movable, isolated relay contacts.

11. The drive device according to claim 10, wherein the relay (2d, 2e) is a double relay which has two relay coils and two relay armatures which are mounted linearly movable relative to each other, wherein each relay armature is movable and is connected to one of the movable relay contacts and a common resetting device.

12. The drive device according to claim 11, wherein the relay armatures are mounted flush and in alignment with each other and the resetting device comprises a spring mounted between adjacent end sides of the two relay armatures.

13. The drive device according to claim 12 wherein the two relay armatures are mounted so that each is repelled by an adjacent pole of the permanent magnet in an unenergized state of the associated relay coil, wherein each relay armature is slidably mounted in an associated one of the relay coils, and wherein when the relay coils are in an energized state, the relay armatures are movable out from the relay coils.

14. The drive device according to claim 11, wherein the relay armatures are mounted so that each is attracted by an adjacent pole of the permanent magnet, wherein each relay armature is slidably mounted in an associated one of the relay coils, and wherein when the relay coils are in an energized state, the relay armatures are drawn into the relay coils.

15. The drive device according to claim 11, wherein the relay armatures are connected to a rotary disc on which are mounted two slip contacts connected to the motor winding and two contact paths adapted for connection to a voltage source, the rotary disc being connected to a resetting device which biases the rotary disc towards a neutral central position in an unenergized state of the relay coil.

16. The drive device according to claim 1, wherein the relay is a sliding relay mounted across a motor shaft of the electric motor.

17. The drive device according to claim 16 further comprising at least one additional relay coil, wherein at least two relay coils are integrated in the relay armature of the sliding relay and form an electromagnet which is mounted in the magnetic field of the permanent magnet of the electric motor having a north pole and a south pole.

18. The drive device according to claim 16, wherein the at least one relay contact comprises a plurality of movable relay contacts and a plurality of stationary relay contacts, wherein the relay armature is connected through an isolator designed as a slide element to two of the movable relay contacts opposite each of which are two of the stationary relay contacts, and wherein two isolator bodies are provided, each as an end stop restriction for the sliding relay.

19. The drive device according to claim 1, wherein the relay coil is mounted in a bridging diagonal of a transistor bridge comprising two sets of two transistors of different conductivity type connected in series and is connected to the collectors of each of two series-connected transistors of different conductivity type, wherein the emitters of each set of the series-connected transistors of different conductivity type are connected to at least one of a positive, a negative, and a mass electrical potential.

20. The drive device according to claim 1 further comprising a second relay coil, wherein the relay coils are connected together through an electrical connection and each is connected at another connection to the load path of a transistor having a base adapted for connection to an output of an electronics control unit.

21. The drive device according to claim 17 further comprising an echo sensor for detecting a motor speed of the electric motor, wherein a signal output of the echo sensor and a signal output of the relay coils are each connected to a common driver and signal detection phase through which both the control signals for controlling the relay and the echo sensor output signals are transferred and selectively amplified and filtered.

22. The drive device according to claim 3, wherein the relay coil, and wherein the relay armature is fixed and the relay coil is movable linearly relative to the relay armature is movable and is connected to at least one of the movable, isolated relay contacts.

23. The drive device according to claim 12, wherein the resetting device comprises a tensile spring.

24. The drive device according to claim 12, wherein the resetting device comprises a compression spring.

25. The drive device according to claim 21, further comprising a plurality of non-used control leads, wherein the echo sensor output signals are transferred through the plurality of non-used control leads.

26. The drive device according to claim 22, wherein the relay armature is mounted such that it is fixed between a north pole and a south pole of the permanent magnet and the relay coil is mounted such that it is linearly movable on the relay armature and is connected to two of the movable isolated relay contacts.

27. The drive device according to claim 22, further comprising another armature, wherein the two relay armatures are mounted aligned and flush with each other and fixed between a north pole and a south pole of the permanent magnet, wherein an end side of each relay armature is opposite one of the poles of the permanent magnet and each relay coil is mounted such that it is linearly movable on the relay armatures and is connected to a movable relay contact.

28. The drive device according to claim 27, wherein the two relay armatures are connected together with a non-magnetic connector part.

* * * * *

UNITED STATES PATENT AND TRADEMARK OFFICE
CERTIFICATE OF CORRECTION

PATENT NO. : 5,877,569
DATED : March 2, 1999
INVENTOR(S) : Peter Heinrich; Helmut Sesselmann It is certified that error appears in the above-identified patent and that said Letters Patent is hereby corrected as shown below:

Column 1, lines 47,49, change "current-less" to -- currentless -- (both occurrences).
Column 1, line 49, replace "of of the armature" with -- of the armature --.
Column 5, line 38, replace "FIGS. 13,14 and 15 shows" with -- FIGS. 13, 14 and 15 show --.
Column 6, line 27, replace "rest, or detent, position" with -- rest or detent position, --.
Column 7, line 25, after "shown in" delete "to".
Column 9, line 6, replace "and are fixedly" with -- is fixedly --.
Column 9, line 6, replace "perspectively" with -- respectively --.
Column 12, line 7, after "motor" insert a comma.
Column 15, line 9, replace "other second" with -- other section --.
Column 15, line 38, replace "with a the movable" with -- with a movable --.
Column 15, line 46, after "relay" delete "(2d,2e)".

UNITED STATES PATENT AND TRADEMARK OFFICE
CERTIFICATE OF CORRECTION

PATENT NO. : 5,877,569
DATED : March 2, 1999
INVENTOR(S) : Peter Heinrich; Helmut Sesselmann It is certified that error appears in the above-identified patent and that said Letters Patent is hereby corrected as shown below:

Column 16, lines 51-55, claim 22 should read:
-- The drive device according to claim 3, wherein the relay coil is movable linearly relative to the relay armature, and wherein the relay armature is fixed and the relay coil is movable and is connected to at least one of the movable isolated relay contacts. --

Signed and Sealed this

Thirteenth Day of March, 2001

Attest:

NICHOLAS P. GODICI

Attesting Officer      Acting Director of the United States Patent and Trademark Office